(12) United States Patent
Yang et al.

(10) Patent No.: US 7,743,071 B2
(45) Date of Patent: Jun. 22, 2010

(54) EFFICIENT DATA HANDLING REPRESENTATIONS

(75) Inventors: Xiaohong Yang, Sammamish, WA (US); Sridharan V. Ramanathan, Kirkland, WA (US); George Randall Dong, Issaquah, WA (US); Zhenyu Tang, Sammamish, WA (US); Anton Pavlovich Amirov, Redmond, WA (US); Sanjay Jacob, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 11/710,806

(22) Filed: Feb. 26, 2007

(65) Prior Publication Data

US 2008/0208918 A1 Aug. 28, 2008

(51) Int. Cl.
    G06F 17/30 (2006.01)
(52) U.S. Cl. .................. 707/783; 707/784; 707/785; 707/786; 705/51; 711/147; 726/1; 726/2; 726/4
(58) Field of Classification Search .................. 707/9, 707/100, 783; 705/51; 711/147; 726/1, 726/2, 4
See application file for complete search history.

(56) References Cited

U.S. PATENT DOCUMENTS

| | | | |
|---|---|---|---|
| 4,328,542 A | 5/1982 | Anastas et al. | |
| 6,182,060 B1 | 1/2001 | Hedgcock et al. | |
| 6,317,750 B1 | 11/2001 | Tortolani et al. | |
| 6,490,593 B2 | 12/2002 | Proctor | |
| 6,542,895 B1 | 4/2003 | DeKimpe et al. | |
| 6,594,672 B1 * | 7/2003 | Lampson et al. | 707/103 R |
| 6,707,454 B1 | 3/2004 | Barg et al. | |
| 6,988,109 B2 | 1/2006 | Stanley et al. | |
| 7,016,912 B2 | 3/2006 | Pasumansky et al. | |
| 7,100,195 B1 | 8/2006 | Underwood | |
| 7,124,192 B2 | 10/2006 | High, Jr. et al. | |
| 7,134,137 B2 | 11/2006 | Joshi et al. | |
| 7,324,991 B1 | 1/2008 | Anjur | 707/5 |
| 7,467,414 B2 * | 12/2008 | Schlesinger | 726/27 |
| 2002/0184260 A1 | 12/2002 | Martin et al. | |
| 2003/0037263 A1 * | 2/2003 | Kamat et al. | 713/202 |
| 2003/0135514 A1 | 7/2003 | Patel et al. | |
| 2003/0220923 A1 | 11/2003 | Curran et al. | |
| 2004/0044905 A1 | 3/2004 | Heath et al. | |
| 2005/0097122 A1 * | 5/2005 | Schafflutzel et al. | 707/102 |
| 2006/0010139 A1 | 1/2006 | Netz et al. | |

(Continued)

OTHER PUBLICATIONS

"Microsoft Office PerformancePoint Server 2007," http://download.microsoft.com/download/3/8/f/38f66127-43b2-47b9-9b5b-07dbd3f85d1c/Overview.pdf, 2 pages (Copyright 2006).

(Continued)

*Primary Examiner*—Apu M Mofiz
*Assistant Examiner*—Monica M Pyo
(74) *Attorney, Agent, or Firm*—Merchant & Gould

(57) ABSTRACT

Embodiments are provided to use metadata to provide readable and/or writeable regions of a multi-dimensional space. In an embodiment, metadata can be used to define readable and/or writeable regions of a multi-dimensional data store. The various embodiments also use relational and/or multi-dimensional representations to resolve and validate readable and/or writeable regions of a multi-dimensional space. Metadata can also be used to designate a number of writeable and/or readable regions of a relational and/or multi-dimensional representation.

16 Claims, 10 Drawing Sheets

U.S. PATENT DOCUMENTS

| | | |
|---|---|---|
| 2006/0020608 A1 | 1/2006 | D'Hers et al. |
| 2006/0031187 A1 | 2/2006 | Pyrce et al. |
| 2006/0190611 A1 | 8/2006 | Miyazaki et al. |
| 2006/0230067 A1 | 10/2006 | Tarnoff et al. |

OTHER PUBLICATIONS

"Oracle Identity Management Concepts and Architecture," *An Oracle White Paper*, http://www.oracle.com/technology/products/id_mgmt/pdf/OracleAS_IDmanagement_10g_TWP.pdf, pp. 1-13 (Dec. 2003).

"Program and performance management from IBM," http://www-03.ibm.com/industries/aerodefense/doc/content/solution/1454069218.html, 3 pages (Publicly known at least as early as Jan. 10, 2007).

"SAS® Strategic Performance Management," Fact Sheet, http://www.sas.com/solutions/spm/fact.pdf, 4 pages (Copyright 2005).

U.S. Official Action mailed Jan. 22, 2009 in U.S. Appl. No. 11/710,799.

Stephen G. Eick, "Visual Multi-Dimensional Data," Visual Insights, Inc., Date: Feb. 2000, pp. 81-87, http://delivery.acm.org/10.1145/610000/604454/p61-eick.pdf?key1=604454&key2=7020348611&coll=GUIDE&dl=GUIDE&CFID=8715356&CFTOKEN=18291872.

"Oracle 9i Data Warehouse Functionality in Mainstream Business Intelligence Applications," Innovative Consulting, Date: Dec. 2001, pp. 1-10, http://www.innovative-consult.com/pdf/dw.o9i%20bi%20apps.pdf.

"arcplan dynaSight with IBM DB2 OLAP Server," Date: 2003, pp. 1-2, http://www.altius.co.uk/dynasight/pdf/IBM_DB2_OLAP.pdf.

U.S. Appl. No. 11/710,799, filed Feb. 26, 2007, entitled "G.P.S. Red Zones", Inventors: Yang, et al.

U.S. Official Action mailed Aug. 19, 2009 in U.S. Appl. No. 11/710,799.

* cited by examiner

| Column Name | Data Type | Allow Nulls |
|---|---|---|
| SubmissionID | bigint | ☐ |
| AssignmentID | bigint | ☐ |
| UserID | bigint | ☐ |
| Status | tinyint | ☐ |
| CreateDatetime | datetime | ☐ |
| ChangeList | image | ☑ |

*FIGURE 7A*

(local).Advent... SQLQuery4.sql*
select * from submissions

| SubmissionID | AssignmentID | Use... | Sta... | CreateDatetime | ChangeList |
|---|---|---|---|---|---|
| 1 | 1 | 14 | 0 | 2007-02-06 20:18:29.237 | 0x00000000 |

*FIGURE 7B*

| Column Name | Data Type | Allow Nulls |
|---|---|---|
| RowId | bigint | ☐ |
| Scenario_MemberId | bigint | ☐ |
| Time_Month | bigint | ☐ |
| Account_MemberId | bigint | ☐ |
| BusinessProcess_Mem... | bigint | ☐ |
| Entity_MemberId | bigint | ☐ |
| TimeDataView_MemberId | bigint | ☐ |
| Currency_MemberId | bigint | ☐ |
| BusinessDriver_Memb... | bigint | ☐ |
| Product_MemberId | bigint | ☐ |
| Flow_MemberId | bigint | ☐ |
| Intercompany_MemberId | bigint | ☐ |
| Value | float | ☑ |
| RuleID | bigint | ☑ |
| ContextID | bigint | ☑ |
| AssignmentID | bigint | ☑ |
| LoadingControlID | bigint | ☑ |
| CreateDatetime | datetime | ☑ |
| ChangeDatetime | datetime | ☑ |
|  |  | ☐ |

FIGURE 8A

```
/(local).Advent... SQLQuery4.sql*
  select * from [MG_ResortMgt_OPEX Model_MeasureGroup_default_partition]
```

| | RowId | S... | Time_Month | Acc... | B... | Ent... | T... | Cur... | B... | P... | Flo... | In... | Value | RuleID | C... | As... | LoadingC... | CreateDatetime | ChangeDatetime |
|---|---|---|---|---|---|---|---|---|---|---|---|---|---|---|---|---|---|---|---|
| 1 | 4091 | 2 | 772003037 | 5144 | 8 | 5011 | 1 | 5004 | -1 | -1 | -1 | -1 | 7000 | -1 | -1 | -999 | 2000 | 2007-02-06 19:41:36.700 | 2007-02-06 19:41:36.700 |
| 2 | 4092 | 2 | 772003037 | 5144 | 8 | 5019 | 1 | 5005 | -1 | -1 | -1 | -1 | 5460 | -1 | -1 | -999 | 2000 | 2007-02-06 19:41:36.700 | 2007-02-06 19:41:36.700 |
| 3 | 4093 | 2 | 772003037 | 5144 | 8 | 5020 | 1 | 5005 | -1 | -1 | -1 | -1 | 6006 | -1 | -1 | -999 | 2000 | 2007-02-06 19:41:36.700 | 2007-02-06 19:41:36.700 |
| 4 | 4094 | 2 | 772003037 | 5144 | 8 | 5021 | 1 | 5005 | -1 | -1 | -1 | -1 | 5110.56 | -1 | -1 | -999 | 2000 | 2007-02-06 19:41:36.700 | 2007-02-06 19:41:36.700 |
| 5 | 4095 | 2 | 772003037 | 5144 | 8 | 5022 | 1 | 5006 | -1 | -1 | -1 | -1 | 9940 | -1 | -1 | -999 | 2000 | 2007-02-06 19:41:36.700 | 2007-02-06 19:41:36.700 |
| 6 | 4096 | 2 | 772003037 | 5144 | 8 | 5023 | 1 | 5006 | -1 | -1 | -1 | -1 | 10934 | -1 | -1 | -999 | 2000 | 2007-02-06 19:41:36.700 | 2007-02-06 19:41:36.700 |
| 7 | 4097 | 2 | 772003037 | 5144 | 8 | 5024 | 1 | 5006 | -1 | -1 | -1 | -1 | 10934 | -1 | -1 | -999 | 2000 | 2007-02-06 19:41:36.700 | 2007-02-06 19:41:36.700 |
| 8 | 4098 | 2 | 772003037 | 5144 | 8 | 5025 | 1 | 5004 | -1 | -1 | -1 | -1 | 7700 | -1 | -1 | -999 | 2000 | 2007-02-06 19:41:36.700 | 2007-02-06 19:41:36.700 |
| 9 | 4099 | 2 | 772003037 | 5144 | 8 | 5026 | 1 | 5004 | -1 | -1 | -1 | -1 | 7700 | -1 | -1 | -999 | 2000 | 2007-02-06 19:41:36.700 | 2007-02-06 19:41:36.700 |
| 10 | 4100 | 2 | 772003037 | 5144 | 8 | 5027 | 1 | 5002 | -1 | -1 | -1 | -1 | 9450 | -1 | -1 | -999 | 2000 | 2007-02-06 19:41:36.700 | 2007-02-06 19:41:36.700 |
| 11 | 4101 | 2 | 772003037 | 5144 | 8 | 5028 | 1 | 5002 | -1 | -1 | -1 | -1 | 10395 | -1 | -1 | -999 | 2000 | 2007-02-06 19:41:36.700 | 2007-02-06 19:41:36.700 |
| 12 | 4102 | 2 | 772003037 | 5145 | 8 | 5011 | 1 | 5004 | -1 | -1 | -1 | -1 | 22000 | -1 | -1 | -999 | 2000 | 2007-02-06 19:41:36.700 | 2007-02-06 19:41:36.700 |
| 13 | 4103 | 2 | 772003037 | 5145 | 8 | 5019 | 1 | 5005 | -1 | -1 | -1 | -1 | 17160 | -1 | -1 | -999 | 2000 | 2007-02-06 19:41:36.700 | 2007-02-06 19:41:36.700 |
| 14 | 4104 | 2 | 772003037 | 5145 | 8 | 5020 | 1 | 5005 | -1 | -1 | -1 | -1 | 18876 | -1 | -1 | -999 | 2000 | 2007-02-06 19:41:36.700 | 2007-02-06 19:41:36.700 |

FIGURE 8B

EFFICIENT DATA HANDLING REPRESENTATIONS

RELATED APPLICATIONS

This application is related to U.S. patent application Ser. No. 11/710,799, filed Feb. 26, 2007, and entitled, "Handling Multi-dimensional Data Including Writeback Data," which is hereby incorporated by reference in its entirety.

BACKGROUND

Businesses continually strive to improve operations, products, services, etc. For example, an enterprise can use an integrated performance management application when planning and making critical enterprise decisions. Enterprise users may use the integrated performance management application to create reports, analyze trends, make projections, etc. Users may rely on data from various data sources, such as from relational or multi-dimensional databases for example, while using the integrated performance management application. In many instances, users would like to write to different data sources. However, many systems and applications provide limited (if any) ability to write to a data source, especially against multi-dimensional data sources. Many factors can contribute to the limited writeback functionality. These factors include the complexities associated with multiple file formats, protection levels, system performance, context sensitive data, incompatible systems, and synchronization issues associated with relational and/or multi-dimensional databases.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to use metadata in part to provide a number of readable and/or writeable regions of a multi-dimensional space. In an embodiment, metadata can be used to define readable and/or writeable regions of a multi-dimensional data store, wherein the metadata can be based in part on at least one of a user, role, user-role association, and/or a model. The various embodiments also use relational and/or multi-dimensional representations to resolve, validate, and process readable and/or writeable regions of a multi-dimensional space. According to the various embodiments, metadata can be used when determining, processing, and/or presenting a number of readable and/or writeable regions of a relational and/or multi-dimensional representation.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 7A-7B depict a data submission table and table content, respectively.

FIGS. 8A-8B depict an example of a fact table and table content, respectively.

DETAILED DESCRIPTION

Embodiments are provided to use metadata in part to provide readable and/or writeable regions and associated representations of a multi-dimensional space. In an embodiment, metadata can be used to define writeable regions of a multi-dimensional data store. The various embodiments also use relational and/or multi-dimensional representations to resolve and validate readable and/or writeable regions of a multi-dimensional space. As described below, metadata can be used to designate a number of writeable and/or readable regions of a relational and/or multi-dimensional data structure. In one embodiment, a business performance application can provide a writeable region representation to a user by using metadata and a number of relational tables to define the writeable region representation.

According to the various embodiments described below, structural metadata can be defined to correspond with dimensions, hierarchies, and/or models, but is not so limited. A number of users, roles, and/or user-role associations can be used to define readable and/or writeable regions of a multi-dimensional space. In one embodiment, user-role associations can be used to define readable and/or writeable regions according to a number of dimensions and/or hierarchies that are associated with the user-role associations. User roles can also be used to define models, and readable and/or writeable definitions can be customized for an associated model.

Metadata that is associated with the readable and/or writeable regions and/or definition can be deployed to a backend server. The backend server can operate to validate the metadata and save it into various relational tables. In one embodiment, the relational tables include: dimension tables; hierarchy tables; user tables; roles tables; user-role association tables; and, other security related tables. The backend server is further configured to communicate relevant information from a relational data store to a multi-dimensional data store. For example, the relevant information can be pushed from a relational database to a number of multi-dimensional databases (e.g. OLAP cubes, wherein each cube corresponds to a model) such that the readable and/or writeable region definitions are defined in the multi-dimensional database as security definitions.

As described below, data security can be enforced during desired times, such as at a desired query time or during writeback for example. Accordingly, information on which regions (e.g. cells) in the query results are writeable can be supplied to a client, so that the client application can prevent users from entering data in read-only regions and/or also inform users of writeable regions. During writeback, a data security check can be performed to ensure that the region (e.g. cell) being written to is indeed writeable.

Figure 1:
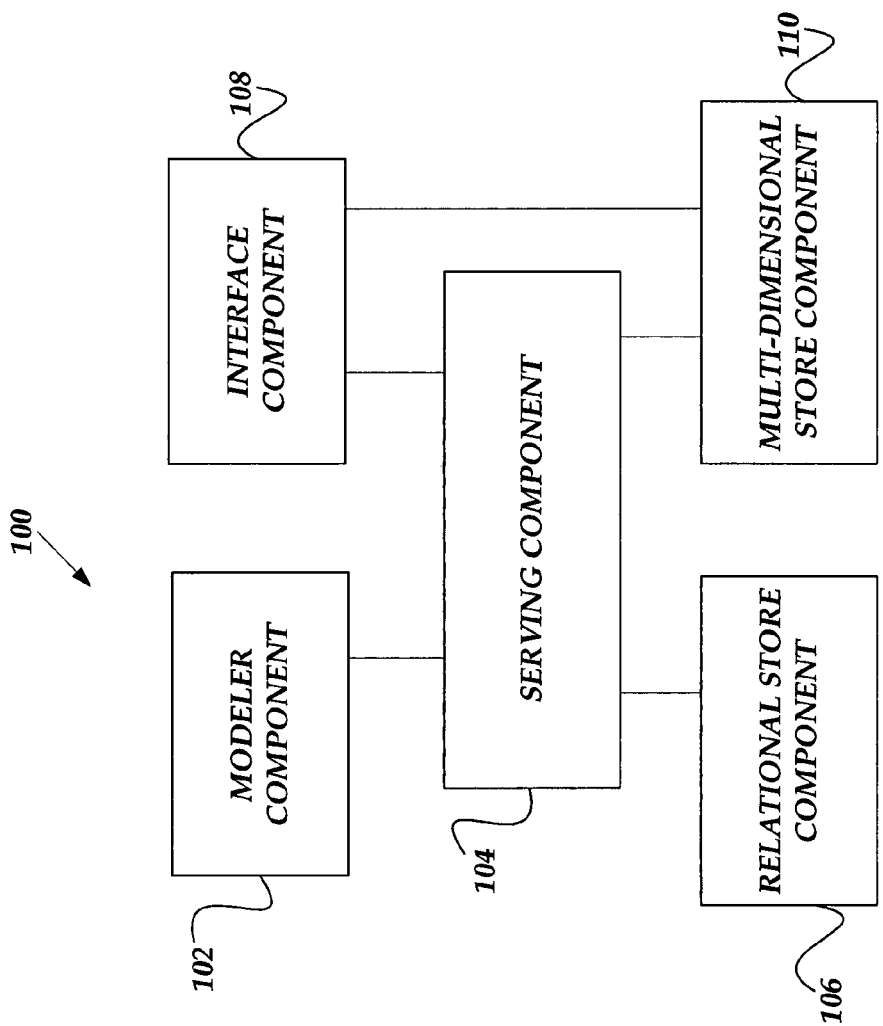
FIG. 1 is a block diagram of a system that uses metadata to provide read and write access to regions of a multi-dimensional data store.

FIG. 1 is a block diagram of a system 100 that includes networking, security, and/or other communication components used to manage, maintain, and analyze information, under an embodiment. In an embodiment, the system 100 can be used to monitor, analyze, plan and/or make critical decisions using associated data. As an example, the system 100 can be used in an enterprise setting to manage operational and financial performance across an enterprise. For example, the system 100 can be configured as a Microsoft® Office® PerformancePoint® Server system that includes a sequel (SQL) Server platform and associated front-end functionality to monitor, analyze, plan and make critical business decisions based on reliable data. The Microsoft® Office® PerformancePoint® Server system is a complete Performance Management (PM) application providing scorecarding, analytics, planning, and other functionality to enterprise and other users.

In one embodiment, the system 100 can be used to manage, maintain, and/or use metadata associated with a data writing (also referred to as writeback herein) process or functionality. The system 100 is configured to use metadata and other information to enable users to efficiently write data to a repository. For example, the system 100 can use metadata to efficiently control or otherwise manage how data is written to a multi-dimensional data store, such as an OLAP cube. The system 100 and its components include functionality to communicate with other computing devices, communication devices and/or other systems and is not limited to the embodiments and examples described herein.

As shown in FIG. 1, the system 100 includes a modeler component 102 configured to create, modify, and manage information, including metadata, but is not so limited. The modeler component 102 can be used to create, modify, and manage metadata associated with models, dimensions, hierarchies, business processes, business rules, reports, forms, and/or security settings, etc. For example, the modeler component 102 can be used to create and/or modify metadata, such as PerfomancePoint® server metadata including metadata models, metadata dimensions, metadata hierarchies, and/or metadata security scope settings. In one embodiment, the modeler component 102 can be configured as a graphical user interface (GUI) tool that can be used by an end-user to create, modify, and manage metadata associated with read and/or write access to a multi-dimensional data store. For example, the modeler component 102 can be used by an enterprise manager to permit certain enterprise users to write to certain cells of an OLAP cube.

The modeler component 102 can be used to grant read and/or write access to a region or regions of a multi-dimensional data store based on certain roles and other permissions. For example, a user can use the modeler component 102 and define various cube roles to grant read and/or write access to users and groups of users, while also limiting access to specific cells or groups of cells of an associated cube. The modeler component 102 can be used to define structural metadata that is associated with models, dimensions, and the users having readable and/or writeable access to certain regions of the multi-dimensional data store or stores.

In an embodiment, the modeler component 102 can be used to capture metadata as defined by a user. The captured metadata can be temporarily stored by the modeler component 102 in memory (e.g., stored in RAM as part of a data structure) until being saved to the serving component 104 (e.g., backend server). As part of a saving request, the modeler component 102 is configured to call a number of server-side APIs, such as a number of web service APIs for example, to communicate any metadata changes to the serving component 104. The serving component 104 can then validate the metadata and save the changes back to the relational store component 106 which includes a metadata store. As described below, the modeler component 102 can define and use metadata and a number of associated security definitions and tables to control read and/or write permissions, including writeback capability to a relational and/or multi-dimensional data store.

In one embodiment, once a number of write permissions have been defined, the associated metadata can be captured by the modeler component 102 and communicated to a serving component 104 for storage in a relational store component 106. For example, the captured metadata can be sent or deployed to a sequel (SQL) serving computer and then stored in a relational database. As described below, the captured metadata can be used to designate writeable regions that a particular user can write to. In one embodiment, the captured metadata can be used to designate a number of writeable sub-cubes, wherein the designated writeable sub-cubes are readily identifiable as writeable regions. For example, a designated writeable region can be highlighted in a particular color, background, outline, font, or other identifying indicia (see FIG. 5).

With continuing reference to FIG. 1, the modeler component 102 is in communication with the serving component 104. For example, the modeler component 102 can communicate with the serving component 104 via a wired, wireless, or combination of communication networks. In one embodiment, the modeler component 102 communicates with serving component 104 using a number of web services application programming interfaces (APIs). As described below, the serving component 104 is configured to respond to various requests from the modeler component 102 and/or an interface component 108. In one embodiment, the serving component 104 is configured to retrieve and update metadata, perform data submissions (e.g. writeback), review and approve assignments, perform business calculations, launch and manage jobs, etc.

The interface component 108 is also in communication with the serving component 104. In one embodiment, the interface component 108 can be configured as an add-in to the Microsoft® Excel® software application or as a web browser enabled application. The interface component 108 can be used to perform various client-side operations such as submitting data, reviewing, approving submissions, etc. As described above, a number of writeable regions can be graphically displayed to the interface component 108 to indicate where a user can enter data (see FIG. 5). Once a user uses the interface component 108, including appropriate access credentials, such an ID for example, the serving component 104 can use the metadata associated with the particular user to present writeable and/or non-writeable regions to the user.

As described above, the system 100 also includes a relational store component 106 for storing metadata, fact data (e.g. the target of a writeback operation), and other information. The system 100 also includes a multi-dimensional store component 110. In one embodiment, the multi-dimensional store component 110 is configured as an OLAP store that is used to store a multi-dimensional aggregation of fact data (e.g. a number of cubes). Once data writeback is processed in the relational store component 106, a refresh of the multi-dimensional store component 110 can be performed to ensure consistency between the two stores. The multi-dimensional store component 110 can be managed using a number of analysis tools. For example, the multi-dimensional store component 110 can be managed and maintained using the Microsoft® SQL Server Analysis Services system. It should be noted that the refresh of the multi-dimensional store component 110 may be set up automatically so that any changes from the relational store component 106 can be propagated to the multi-dimensional store component 110 in real-time or near real-time.

As described above, the modeler component 102 can be used to define regions of data or a multi-dimensional database that a particular user is allowed to write to. In an embodiment, a corresponding writeable region can be graphically presented to a user who is using the interface component 108 to interact with various data. Correspondingly, once the relational tables and associated metadata have been used to define one or more writeable regions, a user of the interface component 108 can quickly and efficiently determine locations where data entry is permitted and not permitted by just looking at the graphical representations of an associated form. Moreover, due to the metadata available during form and report rendering time, the system 100 is able to efficiently determine read and/or write permissions for each user of the multi-dimensional store 110.

A number of security tables can be used to prepare a writeable region data structure, as described further below. The writeable region data structure supports a complex definition of a multi-dimensional writeable region in part by using a number of writeable region scopes. In one embodiment, the scopes can be represented by a union scope operator, an intersection scope operator, and a negation scope operator. The scope operators can be implemented as part of writeable region data structure. As described herein, the scope operators can be used by components that generate and/or consume a writeable region of the multi-dimensional store component 110. Each scope operator can be configured to represent a collection of sub-cubes in the multi-dimensional store component 110.

Correspondingly, each scope operator defines a sub-cube by providing a list of dimension members that define a particular sub-cube. For a multi-dimensional coordinate to be writeable, it has to be in at least one of the scopes represented by the union scope operator. Additionally, for a multi-dimensional coordinate to be writeable, it has to be in "each" of the scopes represented by the intersection scope operator. Moreover, for a multi-dimensional coordinate to be writeable, it should not be present in "any" of the scopes represented by the negation scope operator.

As an example, assume that a union scope contains U1, U2 and the intersection scope contains I1 and the negation scope contains N1. Further assume that a coordinate as seen by a user using the interface component 108 is graphically represented as being a writeable coordinate. Correspondingly, the XYZ or other coordinate representation should be defined to be in data U1 or U2 and intersect with data I1 and should not be in data N1 to be writeable. Stated differently, each scope can be equated to a sub-cube of a multi-dimensional data source.

The system 100 is configured to secure a multi-dimensional data structure and thereby manage read and/or write access to the areas of the multi-dimensional data structure. Securing multi-dimensional data for different users can be critical in an enterprise system. According to an embodiment, the system 100 can use various security definitions that can be associated with particular users, wherein the security definitions can be based on a number of dimension members. These security definitions can be translated by the serving component 104 into both multi-dimensional and relational forms.

Accordingly, read and/or write access restrictions can be defined on the basis of a number of dimension members and/or hierarchies of an associated model. Each model can associate a set of rules for each process. The serving component 104 can include data processing functionality to manage the execution and interpretation of the associated rules in conjunction with structural metadata. For example, the modeler component 102 can be used to allow a user to submit data (and capture the associated metadata) that belong to "Holland", "US" and "Canada" members in an "Entity" dimension. As further example, the modeler component 102 can be used to allow a user to submit data to a certain time (e.g. 2005) and/or scenario (e.g. budget) dimension.

In certain situations, a multi-dimensional representation using a Multi-Dimensional Expression (MDX) language can provide a means to convey user read security information to the multi-dimensional store component 110. Correspondingly, an associated user is only able to read certain data defined by the security information or definitions when they connect to the multi-dimensional store component 110. On the other hand, a relational representation can provide a means to perform a security check when a user is attempting to writeback data values to the multi-dimensional store component 110. For example, SQL stored procedures can be used when performing security checks on submitted data values. The SQL stored procedures can assist to efficiently perform security checks since a large number of data rows may be written back in an enterprise application.

As described above, the modeler component 102 can be used to define read and/or write access for a particular user based on a collection of assigned roles. In an embodiment, a role can correspond with an NT security group model to represent a group of users who share similar security permissions. Instead of defining the same security permission over and over for each user, a role provides a mechanism to define the permission once and then applies to every user who belongs to the role, making it easier to create and maintain. Thus, as defined, an effective read and/or write access for a user can be described as a collection of sub-cubes or subsets of data stored in the multi-dimensional store component 110. This can be represented using a multi-dimensional representation as a collection of different sub-cubes. As discussed in conjunction with FIG. 2 below, as part of a relational representation, security tables for each dimension can be configured to hold information on what dimension members a user has access to for a particular sub-cube definition.

Figure 2:
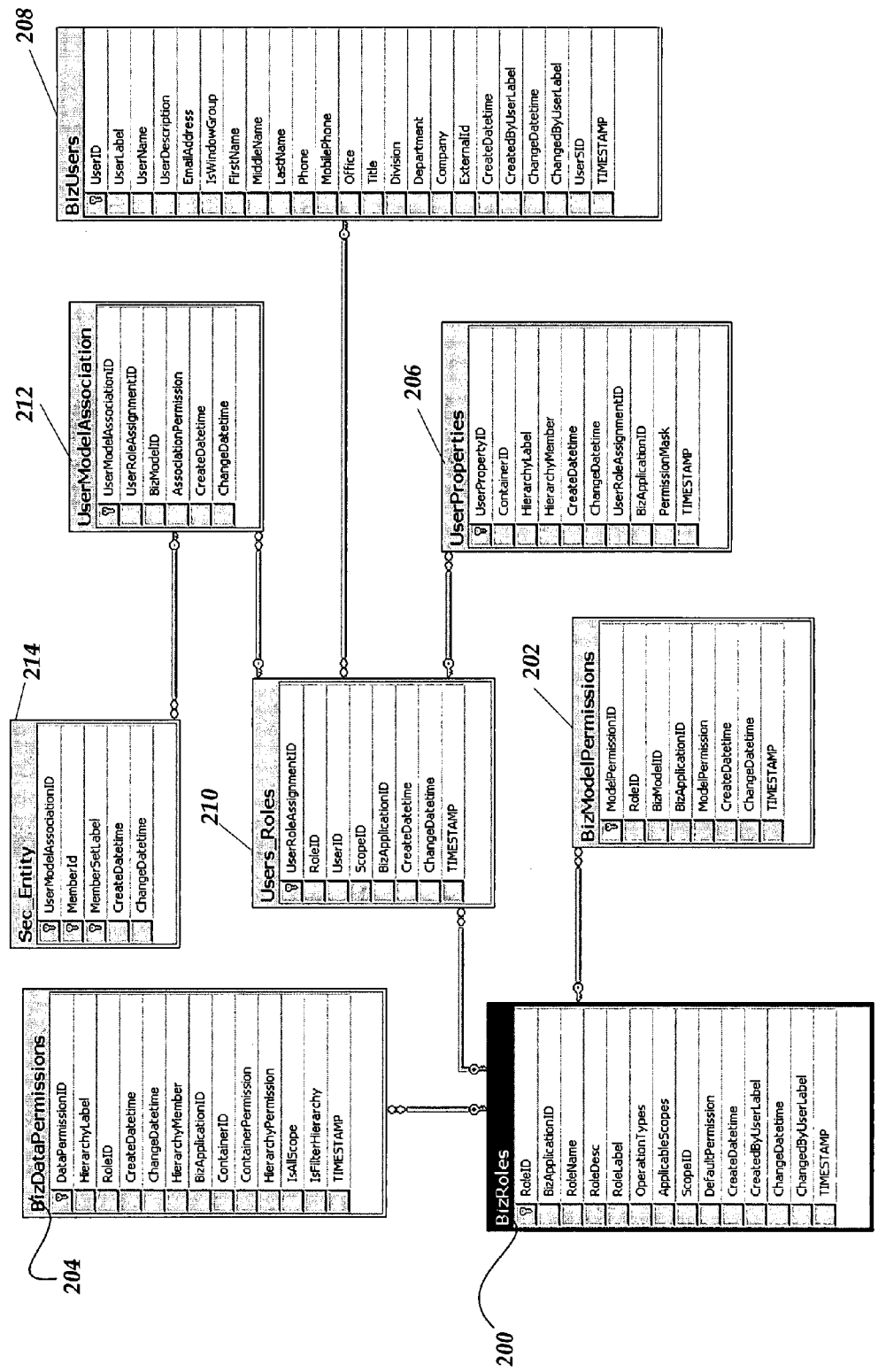
FIG. 2 depicts a number of relational tables that can be used to determine readable and writeable scopes when managing data.

FIG. 2 depicts a number of relational tables that can be used when managing data. For example, the number of relational tables can be used when managing the writing of data to a data repository, such as a relational data store and/or multi-dimensional data store. In an embodiment, the relational tables and associated metadata can be stored in the relational store component 106 and used by the serving component 104 to generate a writeable region representation associated with the multi-dimensional store component 110, as described below. In one embodiment, the relational tables can be configured as security tables and used when managing metadata that is associated with writeback functionality. A security schema code can be used to store metadata associated therewith to the security tables.

As shown in FIG. 2, a BizRoles table 200 includes list of roles, in the context of business roles, for users who have access to certain data. In one embodiment, many of the fields of the BizRoles table 200 have predetermined values. The RoleId corresponds to a particular security definition and can be used to define a shape of the "permission cube". For example, assume that for the same UserID and RoleId and ModelPermissions, a set of members are defined in Dimension security tables for Dimension 1 and Dimension 2.

As a result, the associated user has access to a "square" defined by members in those 2 dimensions, and unrestricted permissions for members in other dimensions. The Default-Permission field can correspond to a Low, Medium, or High role default access setting, with Low being the least restrictive. The BizModelPermissions table 202 includes a list of models that an associated role can access. The ModelPermissions field can be used to define an access level (read/write or both). For example, a "0" can correspond to read access and a "1" can correspond to write access.

The BizDataPermissions table 204 can be used to define what data that an associated role can access. The HierarchyLabel field can be used to define access to a cube dimension defined by an associated record. The HierarchyMember field can be used to define what member(s) access is restricted to (e.g. may contain expressions like Foo.Descendants). The IsFilterHierarchy field can be used to define whether a corresponding record provides a final restriction for a particular role, or that it requires further customization in the UserProperties table 206. In some cases, the Member ID can be used to restrict possible customizations. Correspondingly, a broader role definition and permission customization can be provided for each user within the role. The UserProperties table 206 provides a means for customization of a user's access. The customizations can be made to be in accord with BizDataPermissions table 202.

The BizUsers table 208 provides a list of users in an associated system. The User_Roles table 210 provides a manifestation of the various relationships between users and roles. The UserId field can be used to represent a user for whom the security is defined. A number of tables can also be generated when defining user permissions associated with write and/or read access to a particular data store. As shown in FIG. 2, a UserModelAssociation table 212 can be generated which is a materialization of links between a user, a role and/or model. The Sec_Entity table 214 can be generated to include the members that user role association enabled a user to access a particular model. The MemberId field corresponds to member dimensions that a user has associated permissions. The generated tables enable the system to provide more efficient security related operations.

In an embodiment, SQL based dimension security procedures can be used to provide an efficient security check for read and write operations. Read and write dimension security information can be generated and stored in a number of ancillary SQL tables. Accordingly, security check operations can be performed efficiently by using SQL statements and stored procedures. Additional security tables can be generated to hold information on which dimension members are available to each user according to a particular model. That is, for each model dimension in the model, a dimension security table can be created to store generated security information for each user. In one embodiment, the dimension security tables can be created using a modeling subcomponent of the modeler component 102 when generating a model. A number of application program interfaces (APIs) can be called by the modeling subcomponent to populate the dimension security tables as needed.

The following example illustrates using a number of security tables to represent write security and define writeable region representations for a number of end-users. Correspondingly, the populated security tables and associated metadata can be used to provide graphical representations of one or more writeable regions of a multi-dimensional space.

First assume that the following security definitions are defined by a user using the modeler component 102:

User 1 has access to {Account.Revenue, Account.Expenses} X {Entity.USA}

User2 has access to {Account.COGS} X {Entity.Canada}

The above-described security tables can be used to represent the security definitions defined above.

Moreover, User1 is associated with "UserModelAssociationID 1" and User2 is associated with "UserModelAssociationID 2".

One Dimension is "Account" and the associated Dimension table is "D_Account" as shown as Table 1 below.

TABLE 1

| MemberId | Label |
| --- | --- |
| 1 | Revenue |
| 2 | Expenses |
| 3 | COGS |

The associated Security table is "Sec_Account" as shown in Table 2 below.

TABLE 2

| UserModelAssociationId | MemberId |
| --- | --- |
| 1 | 1 |
| 1 | 2 |
| 2 | 3 |

Another Dimension is "Entity" and the associated DimensionTable is "D_Entity" as shown in Table 3 below.

TABLE 3

| MemberId | Label |
| --- | --- |
| 1 | USA |
| 2 | Canada |

The associated security table is "Sec_Entity" as shown in Table 4 below.

TABLE 4

| UserModelAssociationId | MemberId |
| --- | --- |
| 1 | 1 |
| 2 | 2 |

As described further below, a number of security check stored procedures use the table entries to determine if a particular user has read and/or write access to a particular region in the multi-dimensional store component 110. In an embodiment, the security check stored procedures can be generated at the time an associated model is generated. In one embodiment, at a desired time, such as during a design process, a model can be created using the modeler component 102, wherein the model is defined by the associated metadata. In order to use the model during runtime, associated data structures (e.g. SQL Server and Analysis Services structures) such as Tables, Views, Stored procedures, Dimensions, Hierarchies, Cubes, etc. are created based on the model metadata. By generating the security check stored procedures at the time of model generation, the serving component 104 has access to and knowledge of the metadata generated during the model generation process. Correspondingly, the generated security check stored procedure is customized to each associated model, allowing it to be generated in a most efficient form.

Figure 3:
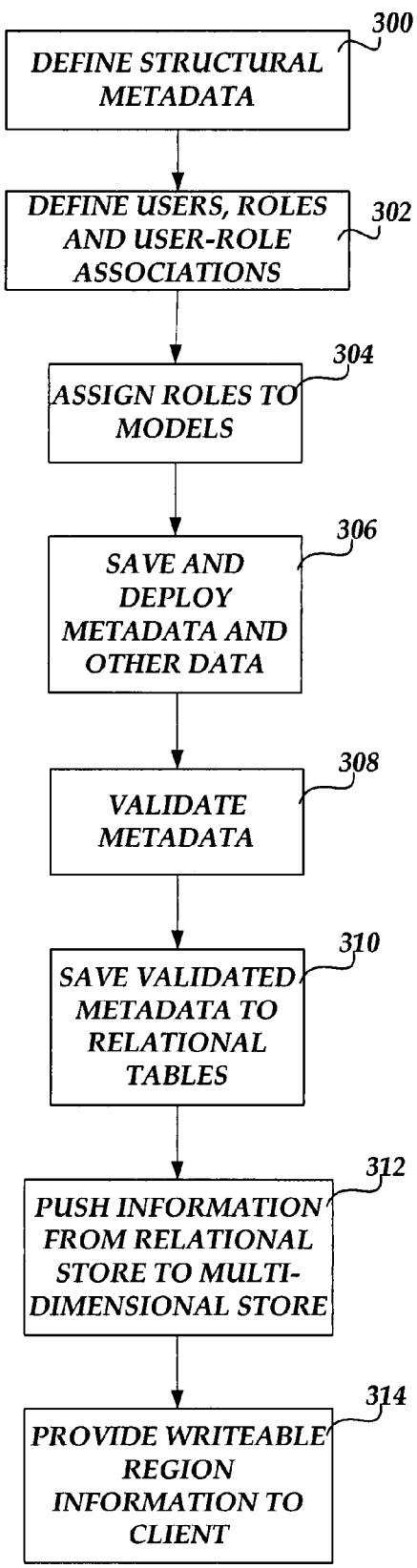
FIG. 3 is a flow diagram illustrating a design-time process for deploying metadata.
Figure 4:
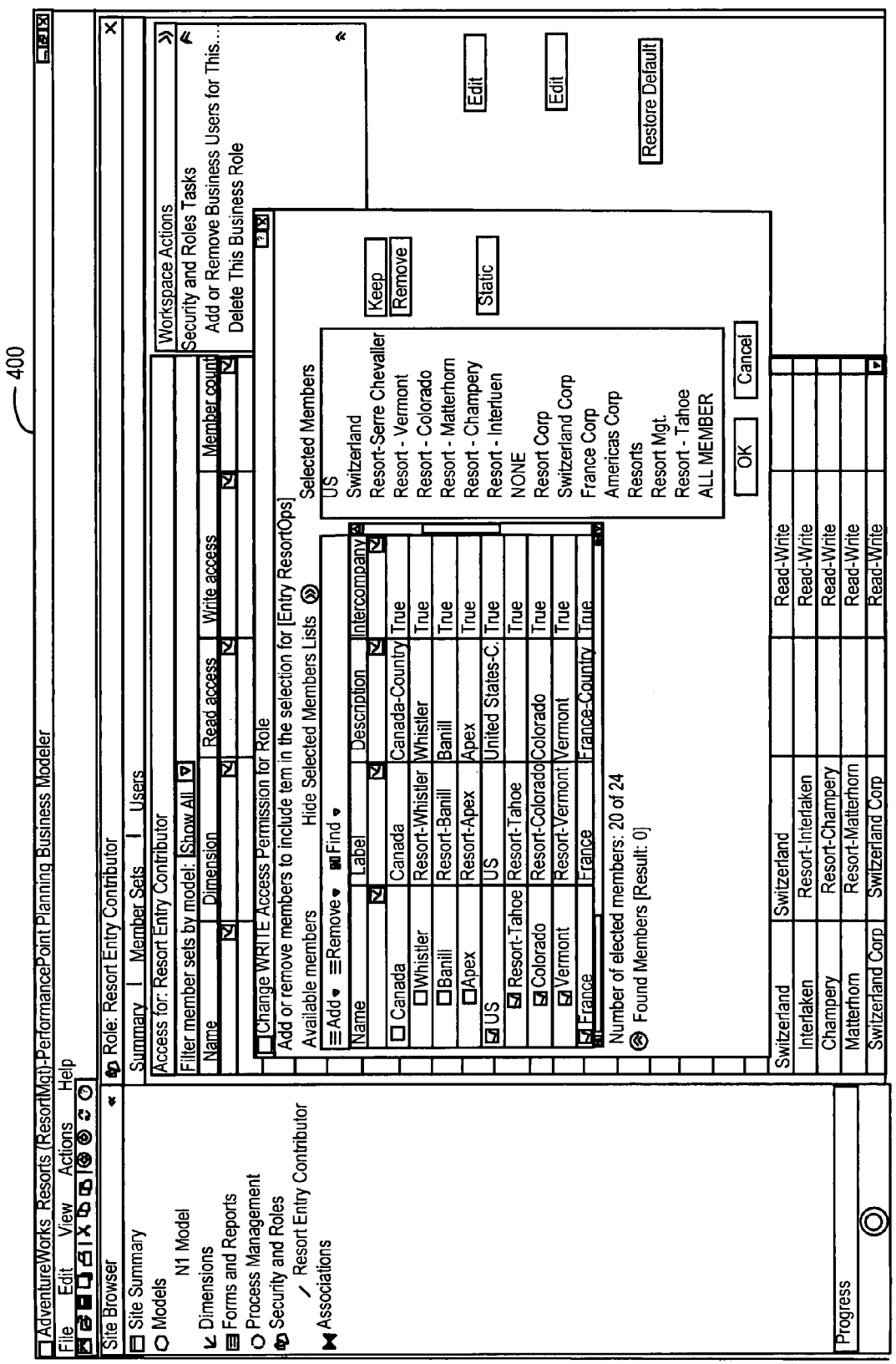
FIG. 4 depicts a modeler user interface that can be used to define structural metadata.
Figure 5:
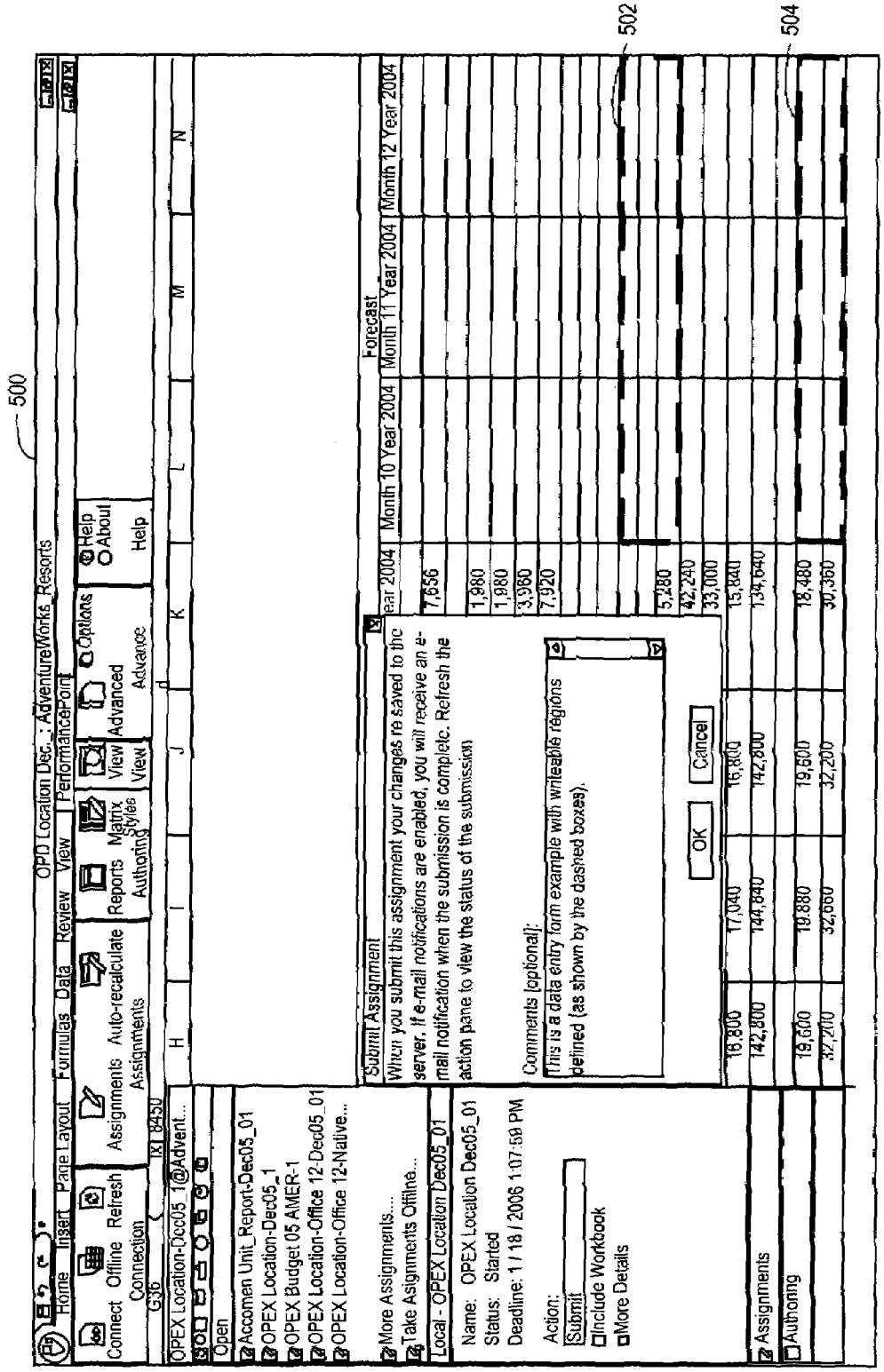
FIG. 5 depicts an interface component for interacting with data.

FIG. 3 is a flow diagram illustrating the design-time process for deploying system metadata from the modeler component 102 to the serving component 104 or other system backend component or components, under an embodiment. The process also includes the creation and use of metadata to define readable and/or writeable regions of a multi-dimensional data store. The components of FIG. 1 are used in the description of the flow diagram of FIG. 3, but is not so limited. FIGS. 4 and 5 are also referred to in the description of the flow diagram of FIG. 3. At 300, a user uses the modeler component 102 to define structural metadata, such as dimensions, hierarchies, models, etc. As shown in FIG. 4, the modeler component 102 is configured as a modeler user interface 400 that the user can interact with. At 302, the user can use the modeler user interface 400 to define users, roles, user-role associations, and other information.

With continuing reference to FIG. 4, the user has checked a number of boxes to define the roles for the particular user. When defining roles, the user is also defining readable and/or writeable regions that correspond with a number of the dimensions and hierarchies. Information associated with the user's interaction is captured by the modeler user interface 400 as metadata. At 304, the user can use the modeler user interface 400 to assign roles to models and may further customize readable and/or writeable definitions for each model. The modeler user interface 400 captures the user interaction as structural metadata and other data. As described below, the captured metadata and other data can be used when determining readable and/or writeable accessibility for a particular user.

At 306, the user can use the modeler user interface 400 to save and deploy the metadata and other data to the serving component 104. At 308, serving component 104 can validate the metadata. In an embodiment, the serving component 104 is configured to validate the metadata by determining if the submitted metadata conforms to defined business logic rules (e.g. a submission for a U.S. entity should have U.S. dollars as the associated currency). If the validation is successful, at 310 the serving component 104 saves the validated metadata to a number of relational tables of the relational store component 106. For example, the serving component 104 can store the validated metadata to a number of: dimension tables; hierarchy tables; user tables; roles tables; user-role association tables; and other related tables.

At 312, the serving component 104 pushes relevant information such as multi-dimensional role permissions, role-user associations, etc. from the relational store component 106 to the multi-dimensional store component 110; thereby publishing the roles to the multi-dimensional store component 110, and rebuilding the associated data and aggregations by re-reading from the relational store component 106 and calculating the associated aggregations. For example, the serving component 104 can push relevant information to a number of OLAP cubes, so that the readable and/or writeable region definitions are defined in each cube, wherein each cube corresponds to a particular model. At 314, the serving component can provide the writeable region information to a number of clients.

FIG. 5 depicts an interface component 500, such as a spreadsheet application for example, that is graphically presenting a number of writeable region representations (shown by the dashed boxes designated 502 and 504 respectively) to a user. As shown, each writeable region 502 and 504 include a number of writeable cells. The writeable region representations 502 and 504 are provided by the serving component 104 to the interface component 500 after validation operations, security check operations, and other operations. In one embodiment, the writeable region representations 502 and 504 can be graphically presented to a user using a particular outline, color (e.g. green, etc.), font, or other visual indicator and/or representation. Correspondingly, a user can quickly and efficiently ascertain particular cells and associated sub-cubes that are writeable.

Figure 6:
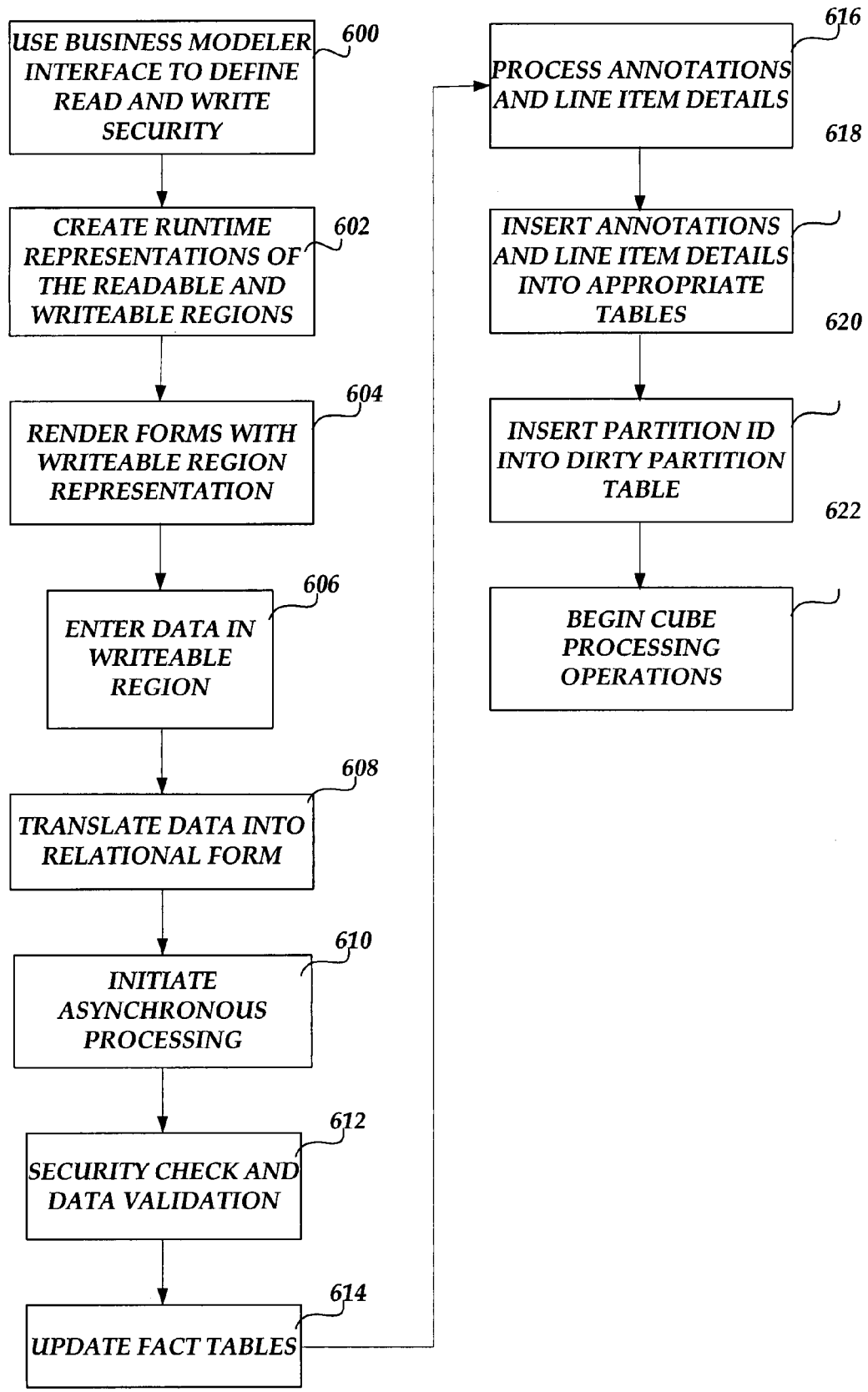
FIG. 6 is a flow diagram illustrating a data writeback process using readable and writeable region metadata.

FIG. 6 is a flow diagram illustrating the creation and use of metadata to define readable and writeable regions a multi-dimensional data source, under an embodiment. In one embodiment, metadata can be created and used as part of a writeback process to write data to writeable regions of a multi-dimensional data store. For example, the details of FIG. 6 can be implemented as part of the Microsoft® Office® PerformancePoint® Server system. At 600, a user can use a business modeling interface, such as the modeler user interface 400 of FIG. 4, to define read and/or write data security according to a model or some desired implementation.

In one embodiment, a business modeling interface can be used to define read and/or write security according to particular dimensions, hierarchies, models, users, roles, and/or user-role associations. For example, a web-based interface can be used to associate users and roles for each model. Thereafter, the defined read and/or write security is captured as metadata by the business modeling interface and communicated to a serving component 104 for use in read and/or write security operations, such as during a writeback process for example. That is, once defined, the metadata can be deployed to the serving component 104.

At 602, once a model and the associated metadata have been deployed to the serving component 104, the serving component 104 uses the metadata and other information to create runtime representations of the readable and/or writeable regions in both relational and multi-dimensional form, including the use of a number of stored procedures. In one embodiment, read security uses Analysis services security functionality for enforcement and write security can be enforced using SQL stored procedures in an application database associated with the serving component 104.

At 604, the interface component 108 is configured for use in rendering a number of associated forms that include a number of writeable region representations (see FIG. 5). In one embodiment, while rendering a form, the system 100 compares writeable region parameters with metadata as part of a query process. For example, data entry forms can be created for users to enter data. In one embodiment, a user can use the interface component 108 to open a form, wherein one or more writeable regions are determined by the serving component 104 and mapped to the appropriate coordinates (e.g. spreadsheet coordinates) associated with the form. As described above, writeable regions (e.g. spreadsheet cells) can be graphically presented or marked to assist the user in determining allowed writeable regions when entering data.

At 606, a user can enter data in the writeable region of the corresponding form. At 608, once a user submits data to a writeable region, the interface component 108 is configured to translate from the coordinates of the associated data entry form into a corresponding relational form (e.g. coordinates) based in part on metadata retrieved from the serving component 104 and metadata associated with the multi-dimensional store component 110. In an embodiment, a submission table includes the user's submitted data set which is compressed into a designated format and sent to the serving component 104 or an associated component (e.g. front-end server or component) and saved in an asynchronous queue. Thereafter, the submission's status is updated as "pending". A submission can include, but is not limited to, multi-dimensional coordinates and the values that have to be written to those coordinates, including annotations and line item details for the respective coordinates. In one embodiment, the compression can be configured as a byte stream compression/decompression process to alleviate the bandwidth load on the system. FIGS. 7A-7B depict a data submission table and the table content, respectively.

At 610, asynchronous processing is initiated by the serving component 104. According to one embodiment, the serving component 104 processes asynchronous work items from the asynchronous queue. The serving component 104 also decompresses and processes the submission data set. During processing, a number of validation operations are performed by the serving component 104 based on the metadata associated with the submission set. For example, a validation operation may include verifying that data in a submission set is part of a writeable region by running system defined and/or user provided validation rules on the serving component 104 or other backend component(s). The result of the validation operations can operate to validate the data and/or raise exceptions with a number of invalid rows. Validation ensures that the submitted data is within the constraints supplied by both the system and the users. While processing the submitted data set, the serving component 104 can add and fill technical columns of various relational tables, such columns may include AssignmentId, LoadingControlId, RuleId, CreateDateTime, ChangeDateTime etc. This ensures that the submission data table matches the backend storage of the associated fact table.

At 612, the serving component 104 performs security check and additional data validation operations on the submitted data. In one embodiment, the submitted data is transferred to a temporary table in the relational data store. A number of security check and validation stored procedures (e.g., storproc) are called to perform the security check and data validation on the data stored in the temporary table. The serving component 104 performs the security check using SQL data generated at 602 to ensure that the user has permission to writeback data to the region (e.g. the submitted tuples) of the data store. The serving component 104 also checks whether the submitted data conforms to certain business logic rules as part of the data validation operations.

At 614, the serving component 104 updates a number of fact tables associated with the user's data submission. If all validations are successful, the data is transferred directly from the temporary tables to fact tables in the relational data store. Each fact table can include an index that contains, as foreign keys, the primary keys of related dimension tables and which contain the attributes of a number of fact records. FIGS. 8A-8B depict an example of a fact table and table content, respectively, as stored in the relational data store. Also, existing data for the same writeable regions and associated relational coordinates can be deleted from the fact table if an Overwrite flag is set. The serving component 104 or other backend component(s) operate to perform additional processing operations to handle updating of multiple measures and deletion of measures based on a Delete_<Measure> flag. This flag can be defined for each coordinate by the user during submission.

Once the fact tables are updated, at 616 annotations and line item details are processed by the serving component 104. Upon a successful security check, at 618 the submitted annotations and line item details can be inserted by the serving component 104 into appropriate tables. At 620, if the writeback to an associated partition of the relational data store was successful, an associated partition ID is inserted into a dirty partitions table of the relational data store. The dirty partitions table enables the serving component 104 to identify and process the particular partitions associated with the data submission, thus allowing more efficient multi-dimensional data or cube processing. The submission status is updated to "Wait-Process".

Figure 9:
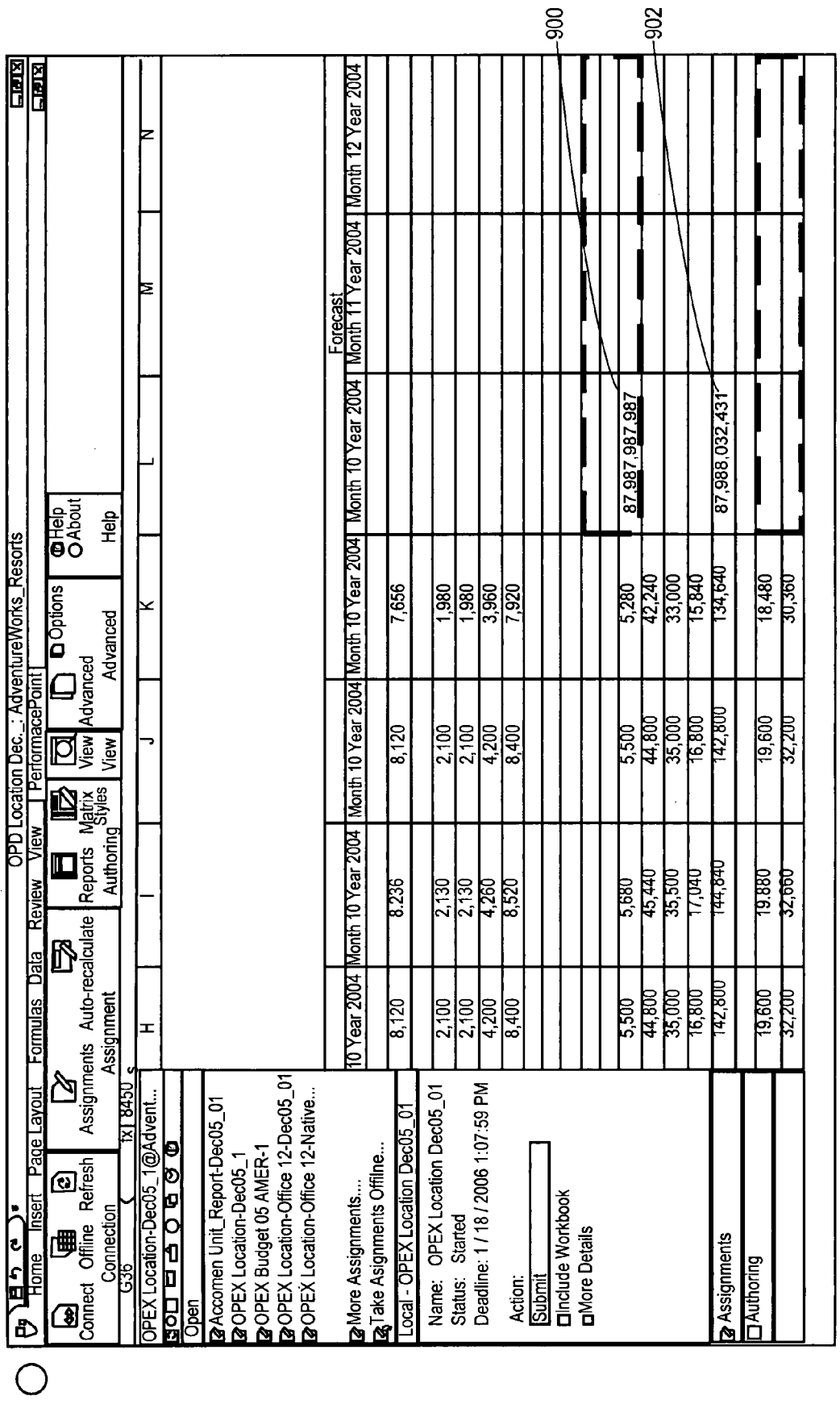
FIG. 9 depicts a client application including submitted data.

At 622, the serving component 104 begins cube processing operations. As part of the cube processing operations, an asynchronous (Async) task can be implemented at appropriate or desired intervals, and the serving component 104 can inspect the dirty partitions table and process any partitions that have become dirty from the prior cube processing operations. The submission status is updated as "Submitted". Correspondingly, the data is now refreshed in the cube. Thereafter, other users querying the cube for the same data are able to view the recently submitted data. FIG. 9 depicts a client application wherein a user has submitted data to a writeable region 900 of a spreadsheet application and a result 902 has been returned to the user as part of the execution of a number of business rules and cube processing operations.

While the system 100 is shown to include a number of components, it can include fewer or more components according to a desired functionality or implementation. For example, the interface component 108 can be configured as part of a client application that is a separate component in relation to the system 100. The system 100 and its components can communicate via a wired, wireless, and/or a combination of communication networks. Moreover, the serving component 104 can include various functionality and other components, such as a front-end functionality, metadata management functionality, line item functionality, writeback functionality, cube processing functionality, security check functionality, data validation functionality, etc. The system 100 can also include multiple clients and is not limited to any particular configuration, wherein each client can include various functionality and other components. As further example, the system 100 can include a plurality of multi-dimensional store components, wherein each multi-dimensional store component represents a particular cube.

As described herein, embodiments are provided to secure portions of multi-dimensional data for different users. Security definitions can be tailored for users based on one or more models, dimensions, hierarchies, roles, user-role associations, etc. In one embodiment, read and/or write permissions can be defined on the basis of read and/or write access to certain dimension members of an associated model. The security definitions can be translated internally into multi-dimensional and relational forms and used to perform security and validation checks on submitted data.

Cubes (e.g. multi-dimensional OLAP cubes) are representative of multi-dimensional data structures. A cube's structure can be defined by measures and dimensions which can be derived from tables. A cube schema includes a set of tables from which the measures and dimensions for a cube can be derived. The cube schema can include a number of fact tables and dimension tables which represent the measures and dimensions of an associated cube. A measure can be represented by a set of values associated with a fact table. A measure can represent the data of primary interest to an end-user. Dimensions are a cube attribute that contains data of a similar type. Each dimension has a hierarchy of levels or categories of aggregated data.

Exemplary Operating Environment

Figure 10:
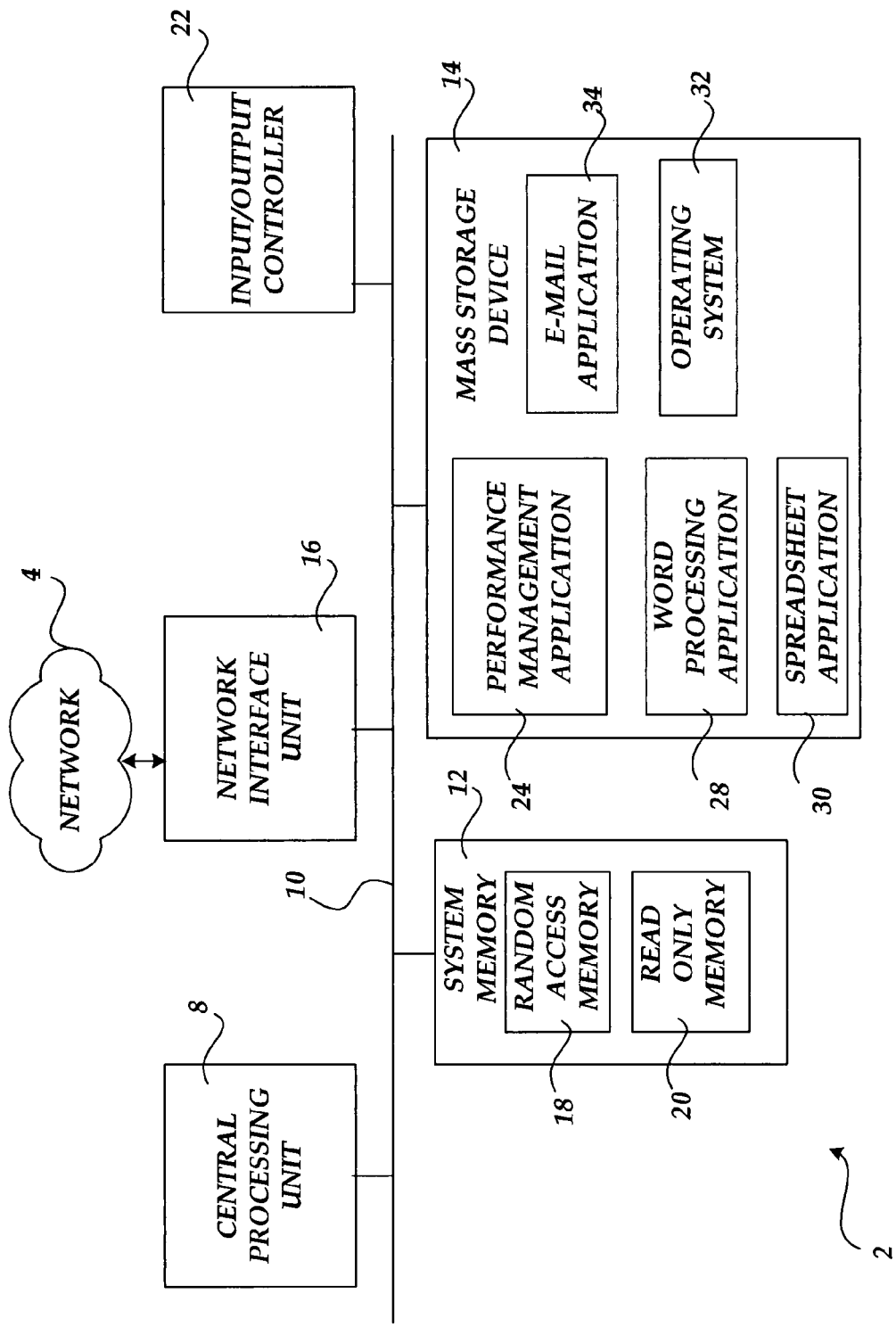
FIG. 10 is a block diagram illustrating a computing environment for implementation of various embodiments described herein.

Referring now to FIG. 10, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 10, an illustrative operating environment for embodiments of the invention will be described. As shown in FIG. 10, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a performance management application 24, and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-readable storage medium including executable instructions which, when executed, manage data by:

receiving an input including an identifier associated with a user role, wherein the user role defines data transaction permissions associated with a multi-dimensional data store;

capturing metadata associated with the data transaction permissions, wherein the metadata corresponds with the user role and identifies the data transaction permissions associated with the multi-dimensional data store, wherein the captured metadata corresponds to a dimension, hierarchy, a model, and a security scope setting that includes an intersection scope operator, union scope operator, and a negation scope operator used to define scopes, wherein to be writeable, a multi-dimensional coordinate has to be included in at least one of the scopes represented by the union scope operator, in each of the scopes represented by the intersection scope operator, and not be present in any of the scopes represented by the negation scope operator;

validating and saving the validated metadata to relational tables including dimension tables, hierarchy tables, user tables, roles tables, user-role association tables, and security related tables; and presenting a number of writeable regions and non-writeable regions of a multi-dimensional data store based in part on an examination of the metadata to determine the data transaction permissions associated with multi-dimensional data in the multi-dimensional data store, the presenting including graphically displaying the number of writeable regions to designate a number of writeable sub-cubes of the multi-dimensional data store that inform an associated user of writeable cube dimensions based in part on a particular model and the user role, the number of writeable sub-cubes including writable dimension members of the multi-dimensional data store.

2. The computer-readable storage medium of claim 1, wherein the instructions, when executed, manage data by defining a number of writeable regions of a multi-dimensional data structure to identify the number of writeable regions, wherein the presenting includes using distinct graphical representations to readily inform the associated user of writeable cells of a cube that the associated user is allowed to write data to.

3. The computer-readable storage medium of claim 1, wherein the instructions, when executed, manage data by providing a visual indication to represent the number of writeable regions of the multi-dimensional data store to an end-user enabling the end-user to graphically identify writeable cells and non-writeable cells, including identifying spreadsheet locations where data entry is permitted and not permitted.

4. The computer-readable storage medium of claim 3, wherein the instructions, when executed, manage data by graphically presenting the number of writeable regions of the multi-dimensional data store to the end-user.

5. The computer-readable storage medium of claim 2, wherein the instructions, when executed, manage data by storing the metadata as part of a relational data store including a number of relational tables including dimension tables, hierarchy tables, user tables, roles tables, user-role association tables, and security related tables, wherein the relational tables are used by a serving component to generate writeable region representations for each associated user.

6. The computer-readable storage medium of claim 1, wherein the instructions, when executed, manage data by modeling writeable regions of a form, wherein the modeling includes designating a number of writeable dimensions associated with the user role and using the metadata to perform a number of security checks when the user attempts a write operation to one of the number of writeable dimensions.

7. The computer-readable storage medium of claim 1, wherein the instructions, when executed, manage data by capturing metadata associated with writeable regions of a multi-dimensional data structure, wherein the metadata is associated with business performance metadata.

8. The computer-readable storage medium of claim 1, wherein the instructions, when executed, manage data by using the captured metadata to limit access to a number of cells of an associated cube.

9. The computer-readable storage medium of claim 1, wherein the instructions, when executed, manage data by using the captured metadata and a number of security tables to define a writeable region data structure.

10. The computer-readable storage medium of claim 1, wherein the instructions, when executed, manage data by using the captured metadata and a number of writeable region scopes to define a collection of writeable sub-cubes of an associated cube.

11. A system to manage data comprising:
a modeler component to define write permissions associated with a number of regions of a multi-dimensional data store, wherein the modeler component generates metadata based on the defined write permissions;
an interface component to interact with permitted regions of the multi-dimensional data store, wherein the permitted regions are presented to distinguish writeable regions of the multi-dimensional data store;
a data management component to manage write access to the permitted regions of the multi-dimensional data store, wherein the data management component can use a number of security definitions and associated metadata to manage write operations, wherein the metadata corresponds to a dimension, hierarchy, a model, and a security scope setting that includes an intersection scope operator, union scope operator, and a negation scope operator used to define scopes, wherein to be writeable, a multi-dimensional coordinate has to be included in at least one of the scopes represented by the union scope operator, in each of the scopes represented by the intersection scope operator, and not be present in any of the scopes represented by the negation scope operator;
validating and saving the validated metadata to relational tables including dimension tables, hierarchy tables, user tables, roles tables, user-role association tables, and security related tables; and,
a serving component to use the validated metadata associated with an associated user as part of presenting the writeable regions and non-writeable regions to the associated user, the presenting including graphically displaying the number of writeable regions in the interface component to designate a number of writeable sub-cubes of the multi-dimensional data store that inform the associated user of writeable cube dimensions based in part on a particular model and the user role, the number of writeable sub-cubes includes writable dimension members of the multi-dimensional data store.

12. The system of claim 11, wherein the metadata is defined according to a user-role association and an associated model.

13. The system of claim 11, wherein the interface component is configured to interact with a form and the form includes a number of visual indicators to identify a number of writeable cells of a cube.

14. A method of managing data comprising:
defining a write permission associated with a region of a multi-dimensional data store, wherein the write permission is associated with a user and an associated model;
capturing information associated with the write permission as structural metadata, wherein the structural metadata corresponds to a dimension, hierarchy, a model, and a security scope setting that includes an intersection scope operator, union scope operator, and a negation scope operator used to define scopes, wherein to be writeable, a multi-dimensional coordinate has to be included in at least one of the scopes represented by the union scope operator, in each of the scopes represented by the intersection scope operator, and not be present in any of the scopes represented by the negation scope operator;
validating the write permission and the structural metadata and saving the validated metadata to relational tables of a relational data store including dimension tables, hierarchy tables, user tables, roles tables, user-role association tables, and security related tables; and, presenting a distinctive representation of the region of the multi-dimensional data store associated with the write permission if the validation was successful, including presenting a number of writeable regions and non-writeable regions of the multi-dimensional data store based in part on an examination of the metadata to determine write permissions associated with multi-dimensional data, the presenting including graphically displaying the number of writeable regions to designate a number of writeable sub-cubes of the multi-dimensional data store that inform an associated user of writeable cube dimensions based in part on a particular model and the user role, the number of writeable sub-cubes including writable dimension members of the multi-dimensional data store.

15. The method of claim 14, further comprising providing an indication of a writeable cell of a cube.

16. The method of claim 15, further comprising writing data to the writeable cell of the cube.

* * * * *

UNITED STATES PATENT AND TRADEMARK OFFICE
CERTIFICATE OF CORRECTION

PATENT NO.       : 7,743,071 B2  Page 1 of 1
APPLICATION NO.  : 11/710806
DATED            : June 22, 2010
INVENTOR(S)      : Xiaohong Yang et al.

It is certified that error appears in the above-identified patent and that said Letters Patent is hereby corrected as shown below:

In column 15, line 4, in Claim 1, delete "and" and insert -- and, --, therefor.

Signed and Sealed this
Eighth Day of February, 2011

David J. Kappos
*Director of the United States Patent and Trademark Office*